Feb. 3, 1959 — A. F. KLINZING — 2,872,022
FLIGHT CONVEYOR GUIDE FOR BARN CLEANERS
Filed Aug. 13, 1957
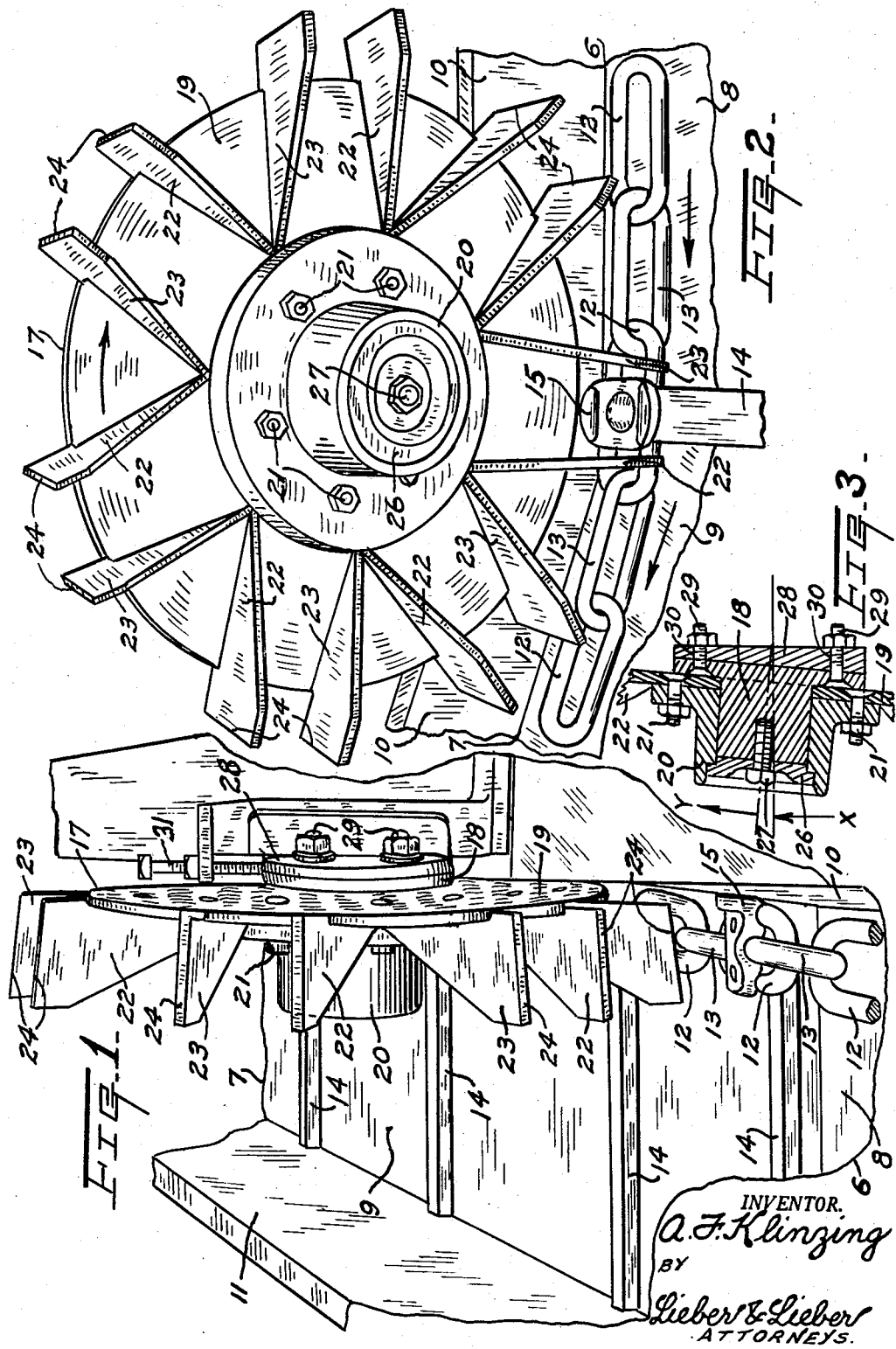

United States Patent Office 2,872,022
Patented Feb. 3, 1959

2,872,022

FLIGHT CONVEYOR GUIDE FOR BARN CLEANERS

August F. Klinzing, St. Paul, Minn.

Application August 13, 1957, Serial No. 678,003

8 Claims. (Cl. 198—137)

This invention relates generally to improvements in mechanism for removing debris from the collecting gutters of cattle housing barns or the like, and it relates more specifically to improvements in the construction and operation of means for guiding and for removing adhering debris from the flight conveying chains of barn cleaners having relatively inclined gutter sections traversed by the successive conveyor flights.

The primary object of the present invention is to provide an improved flight conveyor guide and debris remover for gutter type barn cleaners or the like.

As shown and described in my prior Patent No. 2,768,734, granted October 30, 1956, many of the present barn cleaners embody a horizontal loop shaped debris collecting gutter extending along the rear of the animal stalls with the adjacent ends of the loop connected to inclined gutter discharge delivery and return ramps, and an endless chain conveyor extending throughout the length of the loop and ramps and having a succession of flights attached thereto and spanning the gutter so as to transport debris therealong as the chain advances along the side wall of the gutter remote from the stalls. While satisfactory means for conducting the endless conveyor chains about the horizontal gutter loop and at the upper ends of the debris delivery and return ramps, have heretofore been devised; considerable difficulty is constantly encountered with all prior barn cleaners, in preventing adhering debris from interfering with smooth advancement of the chain and flight at the junction of the horizontal debris delivery end of the gutter loop with the receiving end of the upwardly inclined debris discharge ramp of the gutter, especially when the latter is inclined rather steeply in order to position its delivery end high enough above the ground.

It is therefore an important specific object of my present invention to provide simple and automatically functioning means for obviating such difficulty, and for effecting smooth and unobstructed transfer of the flights and of the conveying chain at the junction of the horizontal and upwardly inclined debris delivery sections of the gutter.

Another important object of this invention is to provide an improved rotor structure operable by the advancing flight propelling chain of a barn cleaner to constantly urge the chain toward one side wall of the debris conducting gutter of a barn cleaner so as to withdraw the free ends of the conveying flights propelled by the chain away from the opposite gutter side wall.

Still another important object of the present invention is to provide a rotary device adapted to be driven by the longitudinally advancing flight conveying chain of a barn cleaner or the like, and which is engageable with the successive horizontal conveyor chain links to tilt the same and to remove excessive adhering debris therefrom.

A further important object of the invention is to provide a guide wheel having outwardly projecting fins cooperable with the adjacent rear and front ends of the successive vertical links of a standard advancing conveying chain to positively rotate the wheel about an axis which is inclined relative to the direction of travel of the chain, whereby the chain is automatically forced toward an adjacent side wall of the gutter and the debris propelling flights are relieved from possible contact with the opposite gutter side wall.

An additional important object of the invention is to provide a rotor for guiding a barn cleaning flight conveying chain from a horizontal to an upwardly inclined direction of travel, which has fins cooperable with the travelling chain links to cause the rotor to revolve without lost motion and without interference by the flight attaching means.

Another important object of this invention is to provide a flight conveyor guide comprising a rotor having vanes the outer free edges of which are inclined relative to the rotor axis and are cooperable with the flight suspension links of the conveying chain to press the adjacent flights toward the bottom of the debris conducting gutter.

These and other more specific objects and advantages of the invention will be apparent from the following detailed description.

A clear conception of the features constituting the present improvements and of the construction and functioning of one commercial embodiment of the invention, may be had by referring to the drawing accompanying and forming a part of this specification wherein like reference characters designate the same or similar parts in the various views.

Fig. 1 is a rear perspective view of one of the improved chain guides showing the same cooperating with fragments of a flight conveying chain and of the debris conducting gutter of a barn cleaner;

Fig. 2 is a side perspective view of the same guiding rotor, showing one pair of its fins coacting with two successive vertical chain links and with the intervening horizontal link which has a fragment of one of the debris transporting flights attached thereto, and also showing fragments of the adjoining horizontal and upwardly inclined debris delivery gutter sections; and Fig. 3 is a horizontal central section through the bearing structure for rotatably supporting the chain guiding wheel for rotation about an axis Y which is inclined relative to the direction of advancement X of the conveyor chain.

While the invention has been shown and described herein as having been embodied in a barn gutter cleaner having a continuous conveyor chain movable longitudinally within a gutter having a horizontal loop section cooperating with a pair of inclined ramp sections to provide a continuous chain confining channel, it is not intended to restrict the use of the improved device to such an assemblage; and it is also contemplated that specific descriptive terms employed herein be given the broadest possible interpretation consistent with the disclosure.

Referring to the drawing, the more or less standard barn gutter cleaner, only fragments of which are shown, comprises in general a debris conducting gutter having a horizontal section 6 adjoining an upwardly inclined refuse discharge ramp 7, provided with flat bottoms 8, 9 respectively and both bounded by continuous upright opposite side walls 10, 11; a conveyor chain having a series of horizontal links 12 articulably connected to the adjacent ends of successive vertical links 13, and being normally longitudinally advanceable along the gutter closely adjacent to the side wall 10 and bottoms 8, 9; and a series of parallel horizontal equally spaced debris transporting flights 14 spanning the gutter near its bottoms 8, 9 and being rigidly secured to the mid-portions of selected horizontal links 12 by attaching clamps 15.

The present improved flight stabilizing and chain guiding device consists primarily of a wheel or rotor 17 mounted for rotation about an axis Y which is inclined relative to the direction X of normal advancement of the conveyor chain as depicted in Fig. 3, upon a vertically adjustable bearing 18. The rotor 17 comprises a disk 19 having a bearing hub 20 secured thereto as by bolts 21, and an annular series of complementary pairs of vanes or fins 22, 23 firmly secured to the side of the disk 19 facing the debris conducting gutter and having outer edges 24 inclined toward the axis Y and away from the gutter. The fins 22, 23 of each pair are so formed and spaced apart that their outer inclined edges 24 will coact with the rear and front ends respectively of the successive vertical links 13 of the conveyor chain, and the rotor 17 should also be positioned vertically so that these inclined edges 24 will engage and slightly tilt the intervening horizontal links 12 and the flights 14 downwardly whenever the latter pass the junction of the horizontal and inclined gutter bottoms 8, 9.

The rotor hub 20 may be detachably secured to the free end of the bearing 18 by means of a retainer plate 26 and a cap screw 27, and the bearing 18 may be adjustably attached to a stationary pedestal 28 by means of bolts 29 secured to the bearing 18 and coacting with vertical slots 30 formed in this pedestal 28, as shown in Fig. 3. The pedestal 28 may also be provided with one or more jack screws 31 for effecting vertical adjustment of the bearing 18 and of the rotor 17 so as to cause the fin end edges 24 to properly coact with the chain links 12, 13, and while the specific mounting of the rotor 17 may be altered considerably it is important that the edges 24 of the fins 22, 23 be inclined away from the gutter and that the rotor 17 be supported to rotate about an axis Y which is inclined relative to the direction of advancement of the conveyor chain, in order to obtain best results.

When the improved conveyor chain guiding and positioning rotor 17 has been properly constructed and installed as shown in the drawing, its normal operation is as follows. Whenever the conveyor chain and the flights 14 are being advanced along the horizontal gutter section 6 and the adjoining ramp 7 the flights 14 which span the gutter will function to urge debris along the horizontal and inclined bottoms 8, 9 of the gutter. As the conveyor chain changes its direction of advancement from horizontal to inclined, it tends to move away from the gutter wall 10 and to thereby cause the free ends of the advancing flight 14 to contact and mar the opposite gutter wall 11 while also subjecting the chain drive to excessive resistance. However, whenever the chain links pass beneath the rotor 17, the sets of fins 22, 23 of each pair automatically engage the rear and front ends respectively of the adjacent successive vertical links 13 and thereby cause the rotor 17 to revolve about its axis Y, while simultaneously causing the outer inclined edges 24 of the rotor propelling fins 22, 23 to engage and tilt the intervening horizontal links 12 and to urge them toward the adjacent gutter wall 10.

This tilting of the horizontal links 12 by the fins 22, 23 not only withdraws the free ends of the advancing flights 14 away from the opposite wall 11, but also urges these flights toward and against the ramp bottom 9 whereby debris is prevented from accumulating in the ramp. The fins 22, 23 furthermore release adhering debris from the chain links 12, 13 and the rotation of the rotor 17 about the inclined axis Y also assists the inclined fin ends 24 in urging the conveyor chain toward and maintaining it closely adjacent to the gutter wall 10 as the chain proceeds along the ramp 7. The spacing of the fin ends 24 also avoids contact thereof with the vane clamps 15 and insures proper driving cooperation with the adjacent ends of the vertical links 13, and the entire operation and functioning of the rotor 17 is automatic after proper installation has been effected.

From the foregoing detailed description it will be apparent that the present invention provides an improved barn cleaner flight propelling conveyor chain guiding and positioning device which is simple and compact in construction and highly efficient in operation. The improved rotor 17 may be made to cooperate effectively with standard conveyor chains having horizontal and vertical links of various lengths, by merely attaching the vanes or fins 22, 23 to the rotor disk 19 in different positions so that they will properly coact with the selected chain links, and the inclination of the fin ends 24 and of the rotor axis Y may also be varied to suit different conditions. The improved units have gone into extensive and highly successful commercial use, and have obviated all of the numerous difficulties encountered by prior guide wheels and rotors heretofore proposed for holding such conveyor chains while advancing from a horizontal gutter bottom 8 onto an adjoining debris discharge ramp bottom 9 especially when the latter is inclined at a relatively steep angle with respect to the horizontal gutter.

It should be understood that it is not desired to limit this invention to the exact details of construcion and operation of the flight conveyor guide herein specifically shown and described, since various modifications within the scope of the appended claims may occur to persons skilled in the art.

I claim:

1. In a guide for the flight conveying chain of a barn cleaner having horizontal and upwardly inclined adjoining debris conducting gutter sections, a rotor having an annular series of complementary pairs of outwardly directed fins each cooperable with the adjacent rear and front ends of the successive advancing vertical chain links to revolve the rotor about its central axis, the outermost edges of said fins being inclined and engageable with the intervening horizontal links to urge the chain toward the adjacent side wall of the gutter at the adjoining horizontal and inclined gutter sections.

2. In a guide for the flight conveying chain of a barn cleaner having horizontal and upwardly inclined adjoining debris conducting gutter sections, a rotor having an annular series of complementary pairs of outwardly directed fins each cooperable with the adjacent rear and front ends of the successive advancing vertical chain links to revolve the rotor about its central axis, the extreme outer ends of said fins being inclined toward said axis away from the gutter and engageable with the intervening horizontal links of the chain to tilt the same and to thereby urge the advancing flights carried by these horizontal links against the gutter bottom and away from the side wall of the gutter nearest to the free ends of the flights at the adjoining horizontal and inclined gutter sections.

3. In a guide for the flight conveying chain of a barn cleaner having horizontal and upwardly inclined adjoining debris conducting gutter sections, a rotor having an annular series of complementary pairs of outwardly directed fins each cooperable with the adjacent rear and front ends of the successive advancing vertical chain links to revolve the rotor about its central axis, said rotor axis being inclined at an oblique angle relative to the vertical plane of longitudinal advancement of the chain to cause said fins to urge said chain toward the adjacent inner side wall of the gutter while said chain travels past the adjoining horizontal and inclined gutter sections.

4. In a guide for the flight conveying chain of a barn cleaner having horizontal and upwardly inclined adjoining debris conducting gutter sections, a rotor having an annular series of complementary pairs of outwardly directed fins each cooperable with the adjacent rear and front ends of the successive advancing vertical chain links to revolve the rotor about its central axis, the outermost edges of said fins being inclined and engageable with the intervening horizontal links to tilt the latter and the flights carried thereby toward the gutter bottom and to urge the chain toward the adjacent side wall of the gutter at the adjoining horizontal and inclined gutter sections.

5. In a guide for the flight conveying chain of a barn cleaner having horizontal and upwardly inclined adjoining debris conducting gutter sections, a rotor having an annular series of complementary pairs of outwardly directed fins each having an outer free end edge inclined toward the rotor axis and cooperable with the adjacent rear and front ends of the successive advancing vertical chain links to revolve the rotor about said axis, said rotor axis being inclined relative to the direction of advancement of the chain to cause said inclined fin edges to urge said chain toward the adjacent side wall of the gutter while said chain travels past the adjoining horizontal and inclined gutter sections.

6. In a guide for the flight conveying chain of a barn cleaner having horizontal and upwardly inclined adjoining debris conducting gutter sections, a rotor having an annular series of complementary pairs of outwardly directed fins each having an outer edge inclined toward the rotor axis and cooperable with the adjacent ends of the successive advancing vertical chain links to revolve the rotor about its said axis, said rotor axis being inclined relative to the direction of advancement of the chain to cause said fins to urge said chain toward the adjacent inner side wall of the gutter while said chain travels past the adjoining horizontal and inclined gutter sections, and said inclined fin edges being engageable with the horizontal chain links to tilt the latter and the flights carried thereby toward the gutter bottom.

7. In a guide for the flight conveying chain of a barn cleaner having horizontal and upwardly inclined adjoining debris conducting gutter sections, a rotor having an annular series of complementary pairs of outwardly directed fins each cooperable with the adjacent rear and front ends of the successive advancing vertical chain links to revolve the rotor about its central axis, said rotor axis being inclined at an oblique angle relative to the vertical plane of longitudinal advancement of the chain to cause said fins to urge said chain toward the adjacent inner side wall of the gutter while said chain travels past the adjoining horizontal and inclined gutter sections, and means for effecting bodily vertical adjustment of said rotor relative to the bottoms of the gutter sections.

8. In a guide for the flight conveying chain of a barn cleaner having horizontal and upwardly inclined adjoining debris conducting gutter sections, a rotor having an annular series of complementary pairs of outwardly directed fins provided with laterally inclined outermost edges and each cooperable with the adjacent rear and front ends of the successive advancing vertical chain links to revolve the rotor about its central axis, said rotor axis being inclined at an oblique angle relative to the vertical plane of longitudinal advancement of the chain to cause said fins to urge said chain toward the adjacent inner side wall of the gutter while said chain travels past the adjoining horizontal and inclined gutter sections.

References Cited in the file of this patent

UNITED STATES PATENTS

| 1,054,305 | Mueller | Feb. 25, 1913 |
| 2,768,734 | Klinzing | Oct. 30, 1956 |